(12) United States Patent
Heath et al.

(10) Patent No.: US 9,861,090 B2
(45) Date of Patent: Jan. 9, 2018

(54) INSECT BAIT STATION METHOD AND APPARATUS

(75) Inventors: Robert R. Heath, Palmetto Bay, FL (US); Pedro Rendon, Guatamala (GT); Nancy D. Epsky, Cutler Bay, FL (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 1262 days.

(21) Appl. No.: 13/397,799

(22) Filed: Feb. 16, 2012

(65) Prior Publication Data

US 2013/0212927 A1   Aug. 22, 2013

(51) Int. Cl.
*A01M 1/20*   (2006.01)

(52) U.S. Cl.
CPC .................................. *A01M 1/2016* (2013.01)

(58) Field of Classification Search
CPC ........ A01M 1/02; A01M 1/165; A01M 1/106; A01M 1/2016; A01M 1/2055; A01M 2200/012
USPC .......................... 43/131, 132.1, 107, 115, 117
See application file for complete search history.

(56) References Cited

U.S. PATENT DOCUMENTS

| | | | |
|---|---|---|---|
| 3,708,908 A * | 1/1973 | Levey | A01M 1/02 229/109 |
| 4,802,303 A * | 2/1989 | Floyd, III | A01M 1/02 43/114 |
| 5,596,833 A * | 1/1997 | Harrie | A01M 1/04 43/122 |
| 5,713,153 A * | 2/1998 | Cook et al. | 43/114 |
| 6,109,537 A | 4/2000 | Heath | |
| 6,516,558 B1 * | 2/2003 | Lingren | A01M 1/02 43/107 |
| 6,758,009 B1 * | 7/2004 | Warner | A01M 1/145 43/113 |
| 6,966,142 B1 * | 11/2005 | Hogsette | A01M 1/2005 43/107 |
| 7,793,461 B2 * | 9/2010 | Klein | A01M 1/14 119/72 |
| 2004/0208953 A1 * | 10/2004 | Heath | 426/1 |
| 2006/0005462 A1 * | 1/2006 | Ballard et al. | 43/132.1 |
| 2010/0071254 A1 * | 3/2010 | Calkins | A01M 1/145 43/107 |

(Continued)

FOREIGN PATENT DOCUMENTS

| | | | | |
|---|---|---|---|---|
| CA | 1125509 A * | 6/1982 | | A01M 1/02 |
| FR | 2297568 A1 * | 8/1976 | | A01M 1/02 |
| JP | 05103571 A * | 4/1993 | | |

OTHER PUBLICATIONS

MathIsFun, Cuboids, Rectangular Prisms and Cubes, MathIsFun.com, all pages for reference to rectangle, at http://www.mathsisfun.com/geometry/cuboids-rectangular-prisms.html.*

(Continued)

*Primary Examiner* — Lisa L Tsang
(74) *Attorney, Agent, or Firm* — John D. Fado; Robert D. Jones

(57) ABSTRACT

The insect bait station comprises an outer shell covered with a toxicant-infused wax coating, and an insect lure disposed within the outer shell. Insects are drawn to the bait station by the insect lure (preferably a fruit fly lure). When the insects land on the bait station they are killed by the toxicant within the bait station wax coating.

9 Claims, 5 Drawing Sheets

(56) References Cited

U.S. PATENT DOCUMENTS

2011/0073671 A1* 3/2011 Mount ............... A01M 1/2044
239/44
2013/0283673 A1* 10/2013 Reinke et al. ................. 43/114

OTHER PUBLICATIONS

English-language translation of FR 2297568.*
Heath, R.R. et al, Laboratory and Field Cage Studies on Female-Targeted Attract-and Kill Bait Stations for Anastrepha Suspensa (Diptera: Tephritidae), Pest Manag Sci, 2009, 672-677, vol. 65.

* cited by examiner

INSECT BAIT STATION METHOD AND APPARATUS

FIELD OF THE INVENTION

This disclosure relates to a method and apparatus for killing insects. Specifically, the insect bait station described herein comprises a wax-coated outer shell and a removable insect lure (for example a fruit fly lure). This disclosure also describes a method of making and using the bait station.

BACKGROUND OF THE INVENTION

Fruit flies pose serious concerns for fruit and vegetable producers. Currently, producers rely primarily on sprayed toxicants to control fruit fly populations. However, sprayed toxicants have multiple potentially adverse environmental effects, and toxicants applied directly to edible fruits and vegetables raise additional consumer safety concerns. Consequently producers are looking for alternative pest control means which have fewer consumer safety and environmental risks.

Strategically placed trapping systems can be an alternative means of controlling fruit fly populations. At least one prior art trapping system targets fruit flies by using a perforated wax-coated base. The wax coating comprises a matrix containing an attractant, feeding stimulant, a visual attraction feature, and a toxicant. However, the prior art apparatus requires large amounts wax and relatively expensive toxicant. Further, the prior art units are not durable and are limited to a single attractant.

The need exists for a cost-effective, long-lasting and versatile means of controlling insect pests such as fruit flies. The current insect pest control system comprises a bait station that uses inexpensive materials (such as cardboard) as support/holder of a toxicant-infused wax matrix. When deployed in the field (and combined with specific insect attractants), the bait station described herein will effectively control fruit fly populations.

SUMMARY OF THE INVENTION

This disclosure is directed to an insect bait station. The bait station comprises a substrate that is foldable into a bait station shell. The bait station shell is covered by a toxicant-infused coating and an insect lure is positioned inside the shell. The bait station is structured so that insects attracted to the lure land on the shell coating and are killed by the toxicant.

This disclosure is also direct to a method of making a bait station. In accordance with the current method, a flat pre-cut, substrate is provided and a user folds the substrate into a bait station shell. An insect lure is inserted in the bait station shell so that when an insect lands on the shell, the insect is killed by the toxicant.

DETAILED DESCRIPTION OF PREFERRED EMBODIMENTS

Figure 1:
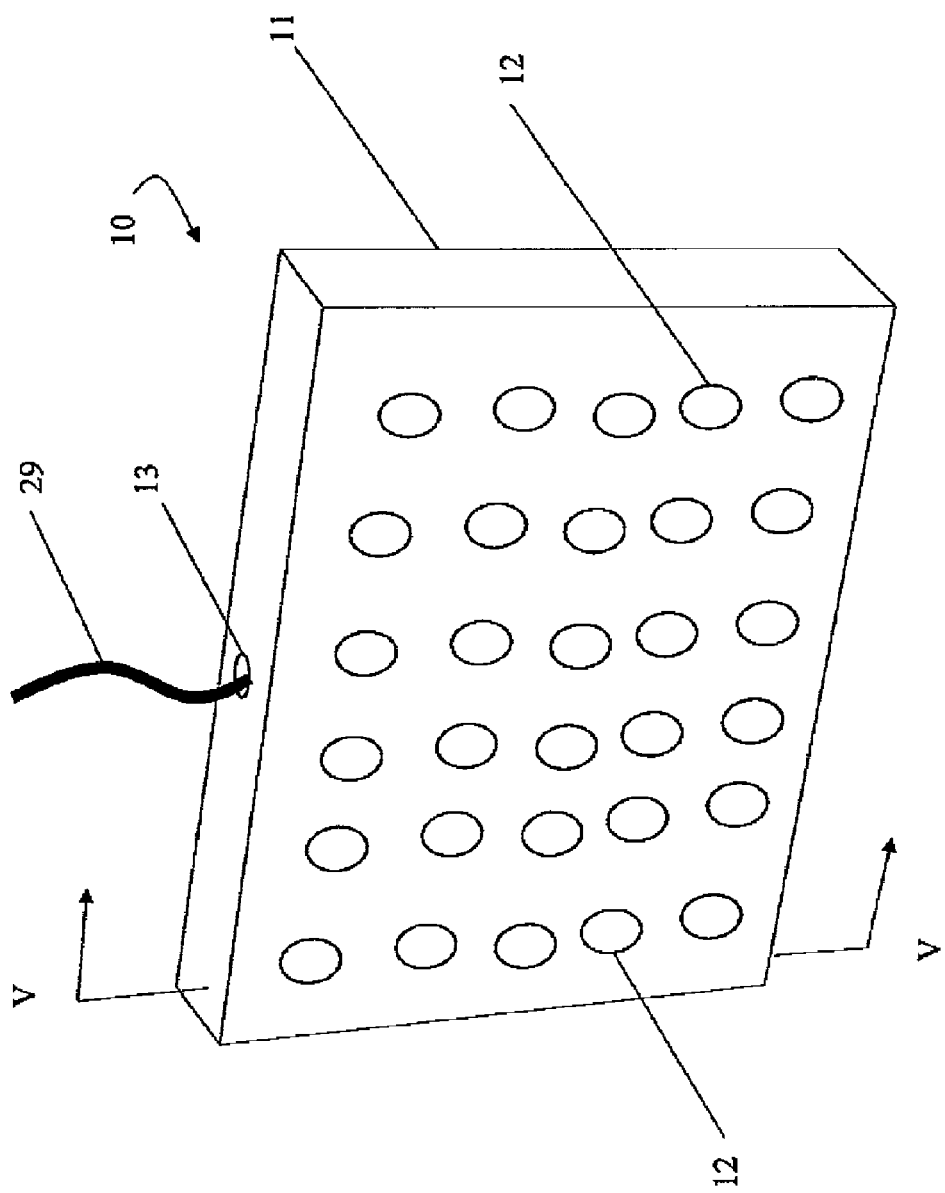
FIG. 1 is an elevational perspective view of the bait station in an assembled configuration.
Figure 2:
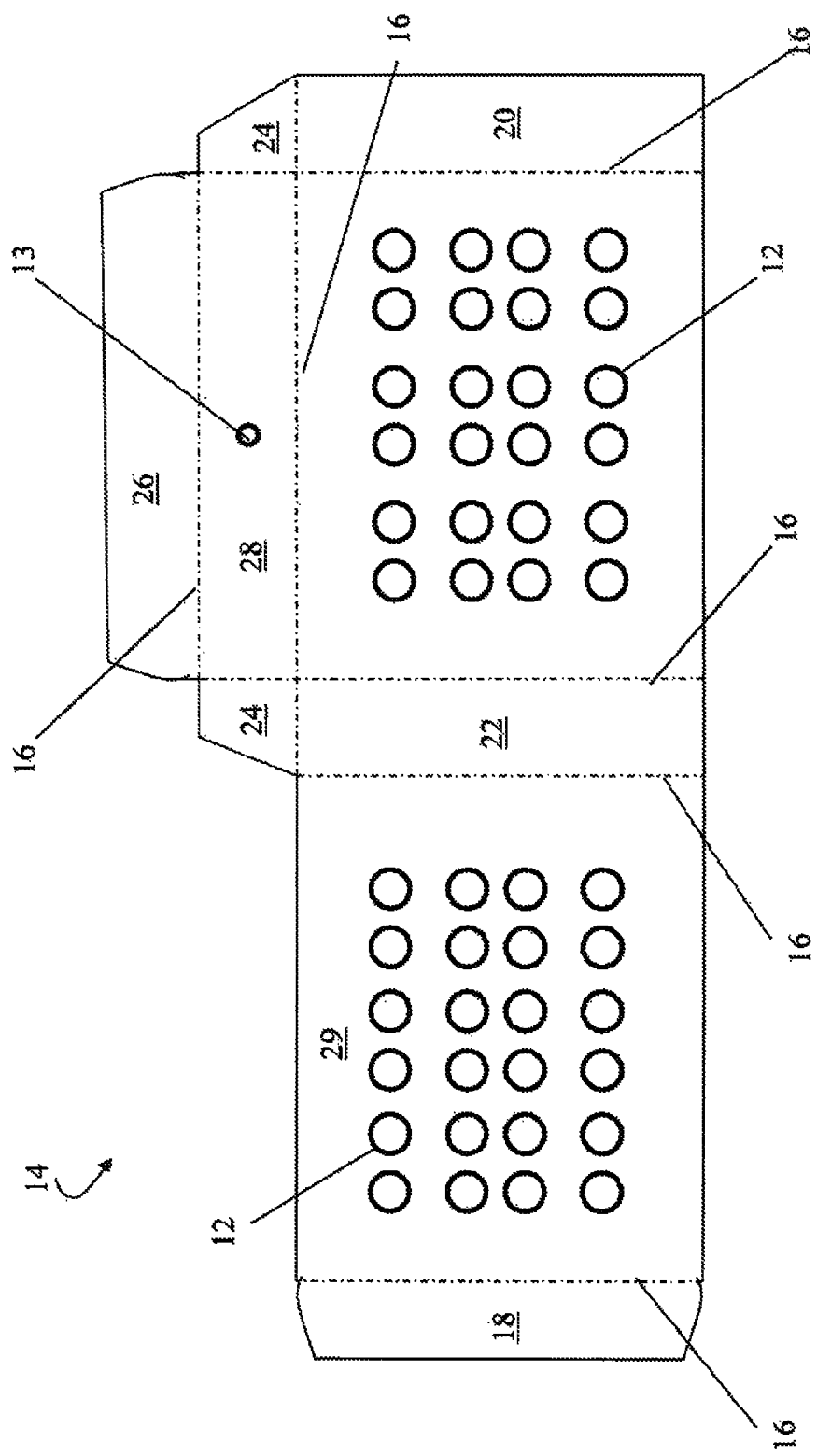
FIG. 2 is a plan view of the bait station outer shell in a flattened, pre-assembled configuration.
Figure 3:
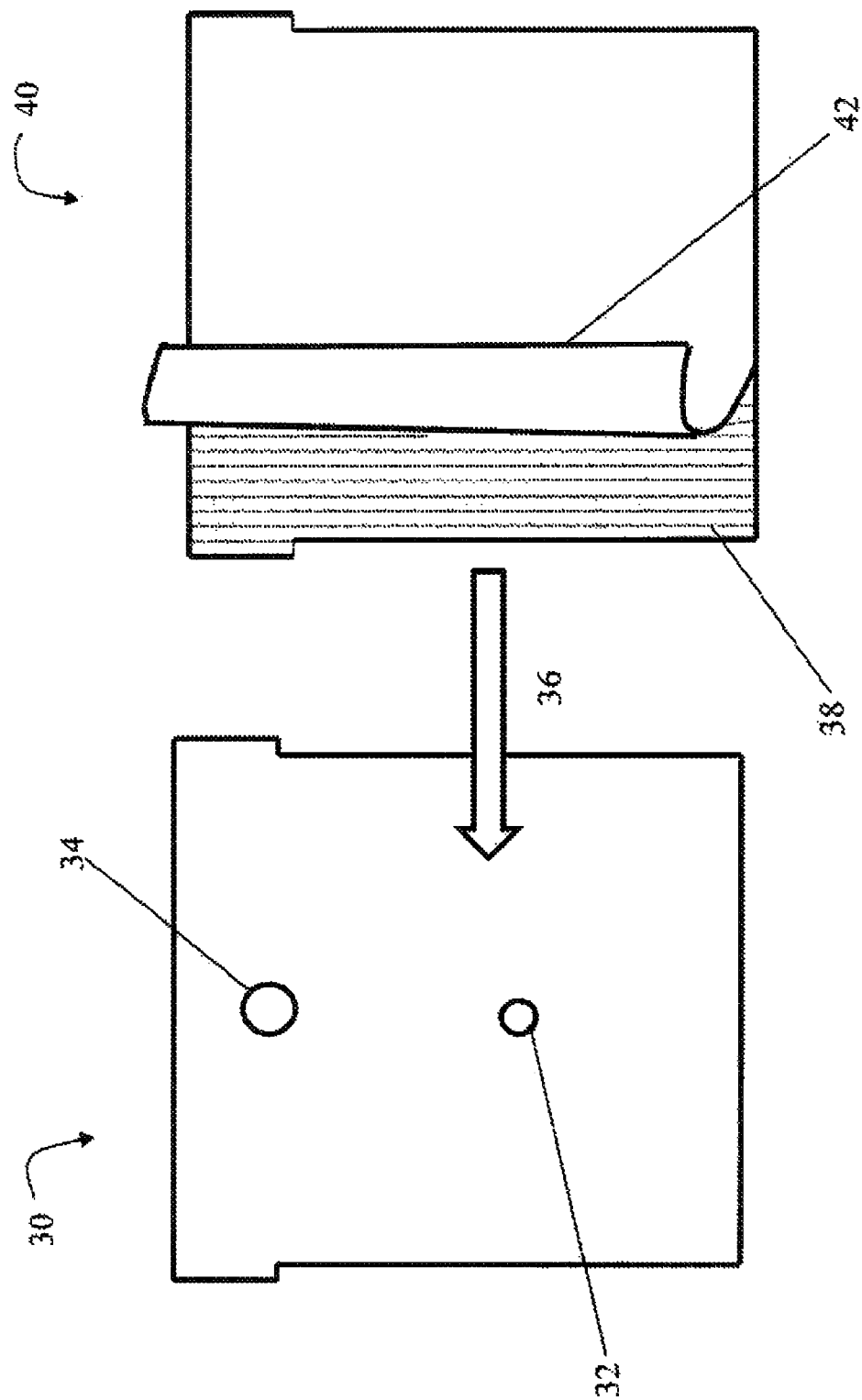
FIG. 3 is an assembly view of the bait station lure holder and an exemplary lure.

As generally shown in FIG. 1, the bait station 10 described herein comprises a box-type perforated outer shell 11 in combination with an attractant insect lure 40 (not shown in FIG. 1, see FIG. 3). The front and back sides of the bait station 10 include a plurality of apertures 12 (note that for simplicity, only-exemplary apertures 12 are identified with reference numbers in FIGS. 1 and 2). In the preferred embodiment, there are twenty four apertures 12 on each of the front and back sides of the bait station 10, and each of the apertures 12 has a diameter of approximately 8 mm. A-suspension aperture 13 in the top of the bait station 10 can accommodate a bait station suspension means.

The bait station outer shell 11 (shown in FIG. 1) is formed by folding the essentially flat pre-cut substrate 14 (shown in FIG. 2) inwardly along designated fold lines. This construction is extremely advantageous because it enables the bait station shell 11 to be inexpensively mass produced, shipped, and stored. In the preferred embodiment, before assembly, the pre-cut bait station substrate 14 has a length of 256.39 mm, and a width of 115.89 mm, and a thickness of 0.56 mm.

As shown in FIG. 2, to construct the bait station outer shell 11, section 18 is glued to section 20 so that the connected overlapping sections 18, 20 form a first lateral side, and section 22 forms a second (oppositely disposed) lateral side of the bait station box 10. As section 26 is folded downwardly, tabs 24 are folded into the interior of the box 10. Section 26 is glued to an upper interior portion of the back section 29. Section 28 forms a top portion of the shell 11.

In the preferred embodiment, the top section 28 is 101.60 mm long and 19.84 mm wide so that the top section has a surface area of 2,015.74 mm$^2$. The suspension aperture 13 in the top section 28 has a diameter of 4 mm. Each of the lateral sides is approximately 19 mm (horizontally) wide and 80.96 mm (vertically) long and has an area of approximately 1,500 mm$^2$. The front and back sides of the shell 11 are approximately 101.6 mm (horizontally) wide and 80.96 mm (vertically) long. Each of the front and back sides has a surface area of 8,225.45 mm$^2$ before the twenty four apertures 12 are cut and removed, and an area of 7,823.42 mm$^2$ after the apertures are removed.

In the preferred embodiment, the total effective surface area of the assembled bait station 10 is approximately 20,638.2 mm$^2$. The effective weight of the bait station 10 (without the insect lure 40 or lure holder 30 shown in FIG. 3) is approximately 7.61 g.

In alternative embodiments, the bait station shell 11 may be comprised of plastic, metal or any other material known in the art and may be assembled from distinct and separate spare parts rather than a single foldable substrate 14. Further, the bait station 10 (and shell 11) may have any geometric shape or dimension consistent with an intended use. Similarly, in alternative embodiments, the apertures 12 described herein may have alternative shapes and sizes, and the suspension aperture 13 may, or may not be present. Although the various sections of the bait station shell 11 are described as "glued", the bait station components may be connected by any means known in the art.

As shown in FIG. 3, in the preferred embodiment, the bait station 10 may further comprise a cardboard lure holder/insert 30. The lure holder 30 is slightly smaller than the bait station 10 so that the lure holder 30 easily slides into the open bottom portion of the outer shell 11 of the bait station 10. The lure holder 30 generally includes a retention aperture 32 and an alignment aperture 34.

In operation, a suspension means 29 (for example a cord—see FIG. 5) is knotted and then threaded through the retention aperture 32 so that the knotted portion 31 of the cord 29 is too large to pass through the retention aperture 32, and the cord 29 is thereby secured to the lure holder 30. The free end of the cord 29 (opposite the knot 31) is then threaded through the alignment aperture 34 so that the when the lure holder 30 is suspended by the free end of the cord, 29 the lure holder 30 assumes an essentially vertical orientation. When the bait station 10 is ready to be deployed, the free end of the cord 29 is further threaded through the suspension aperture 13 (see FIGS. 1, 2 and 5) of the bait station outer shell 11 and tied to a tree branch or some alternative means of support.

Figure 5:
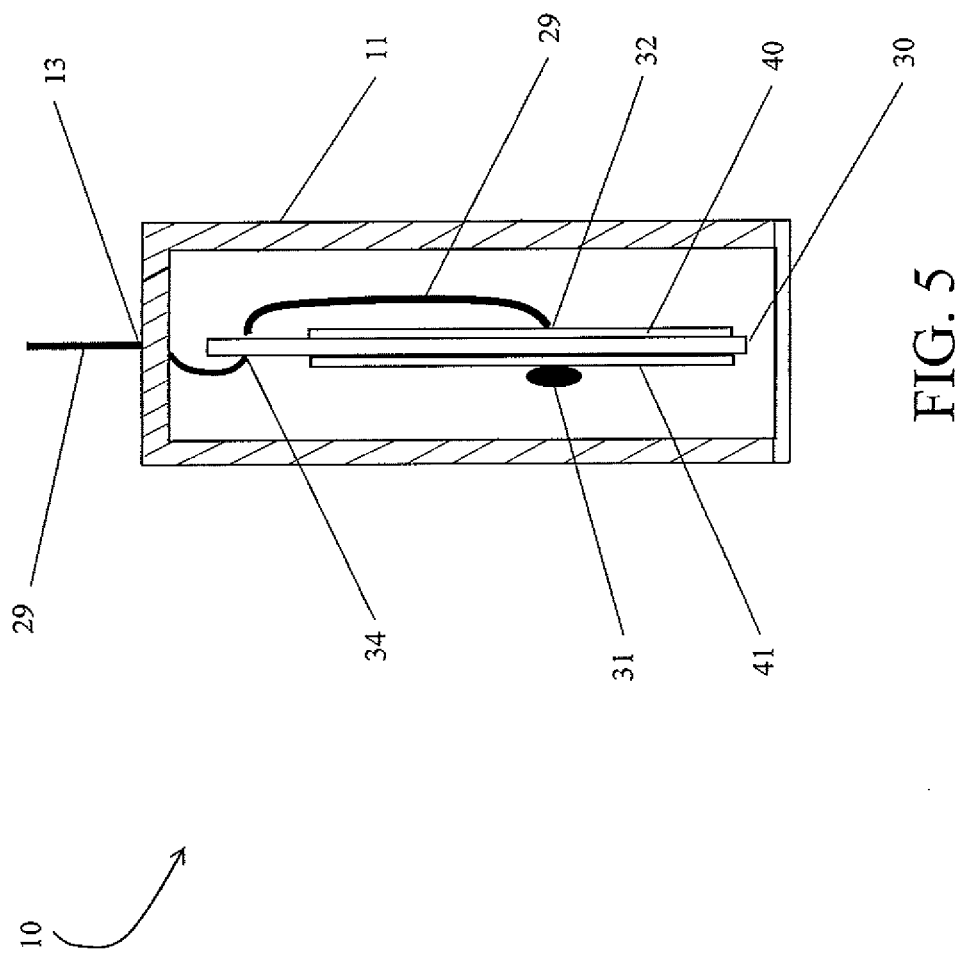
FIG. 5 is a cross sectional profile view of the bait station along the section line V shown in FIG. 1.

As shown in FIGS. 3 and 5, in the preferred embodiment, at least one insect lure 40 is attached to the lure holder 30. As indicated by the arrow 36, the lure 40 may be glued to the face of the lure holder 30 or secured by any means known in the art. Preferably, as shown in FIG. 5, a first lure 40 is attached to a first side of the lure holder 30, and second lure 41 is attached to an opposite second side of the lure holder 30. In the preferred embodiment, the second lure 41 is essentially a mirror image of the first lure 40.

The lure(s) 40 may comprise a variety of pheromones or food attractants, or any combination thereof. As shown in FIG. 3, the most commonly used lures 40 have a volatile chemical surface 38 that is covered by a peel-away seal 42. Once the seal 42 is removed, the chemical surface 38 emits the attractants. With regard specifically to fruit flies, in the preferred embodiment a combination of ammonium acetate, putrecine and trimethylamine are used as attractants.

In alternative embodiments, multiple (generally smaller) individual specialized lures may be attached to the lure holder 30 to create a composite or mosaic of attractants. The composite of attractants may be designed to attract a variety of species and/or sub species of a target insect, or additionally/alternatively the composite attractant may attract a variety of different insects. In a further alternative embodiment, the physical structure of the lure 40 may be sufficiently robust so that a lure holder 30 is not required. One or more apertures may be made directly in the lure 40 so that the retaining cord goes directly from the lure 40, out the suspension aperture 13, and is connected to a support. In a further alternative embodiment, the lure may be attached to the inside of the outer shell.

Once the bait station 10 is assembled, the outer surface of the bait station is covered with a toxicant-infused wax-based coating. The components of the wax coating are summarized below in Table 1:

TABLE 1

| Ingredient | Percentage (% w/w) |
| --- | --- |
| Paraffin | 56.523 |
| EVA | 8.917 |
| Sorbitan monostearate | 3.566 |
| Corn Syrup | 24.44 |
| Sugar (Sucrose) | 2.453 |
| Toxicant | 4.080 |
| Green Colorant (Powder) | 0.020 |
| Total | 100 |

To prepare the coating, paraffin blocks are sectioned and placed in a large pot-type cooking container so that the paraffin blocks are allowed to melt. The mixture is maintained at 90° C. (194° F.), even though paraffin melts at ca. 60/64° C. (140/147° F.). While the paraffin temperature is increasing, a hardener, ELVAX (ethylene vinyl acetate (EVA)) is gradually added and blended into the paraffin, preferably with a heavy duty mechanical overhead stirrer.

Once the full amount of EVA (according to the volume preparation required) is deposited within the melted wax, a surfactant/emulsifier SPAN 60 (Sorbitan monostearate) is added. The mixture is continuously stirred, and the temperature is gradually increased to 140° C. (284° F.). At 140° C. (284° F.) the paraffin, EVA and Sorbitan monostearate mixture should be fully melted/blended.

After the three component blend is formed, the temperature of the mixture is gradually reduced to 90° C. (194° F.). At 90° C. (194° F.) additional ingredients are added in the following order: Corn syrup, granulated sugar, powder colorant and a toxicant. In the preferred embodiment, the toxicants CONSERVE SC or TRACER (Spinosad) are used, however multiple other toxicants that are well known in the art may also be used. The percentage of toxicant shown in Table 1 corresponds with the use of Spinosad, however varying amounts of toxicant may be used based on the specific characteristics of the selected toxicant. The mixture should be stirred continuously as the ingredients are added to create a uniform mixture. After the ingredients are blended, the temperature is allowed to drop to 80° C. (176° F.).

The blend is then transferred/filtered (passing through a metal strainer) to a wax coating supply reservoir, which fits/sits on top of a water bath (heated at 85° C./185° F.). The water bath maintains the blend/wax coating at a temperature of approximately 80° C. (176° F.). The supply reservoir is the source of the wax blend used to coat and impregnate the outer surface of the bait station.

The blending process is summarized in Table 2 below:

TABLE 2

| Activity/Ingredient | Temperature | Required Time (mins.) |
| --- | --- | --- |
| Melting Paraffin | 90° C. (194° F.) | 20 |
| Mixture: Paraffin, EVA and Sorbitan Monostearate | 140° C. (284° F.) | 15 |
| Temperature reduction and addition of corn syrup, granulated sugar, powder colorant and toxicant | 140° C. to 90° C. (284° F.-194° F.) | 45 |
| Temperature reduction and pouring the wax blend into the water bath supply reservoir | 90° C.-85° C. (284° F.-185° F.) | 15 |

Figure 4:
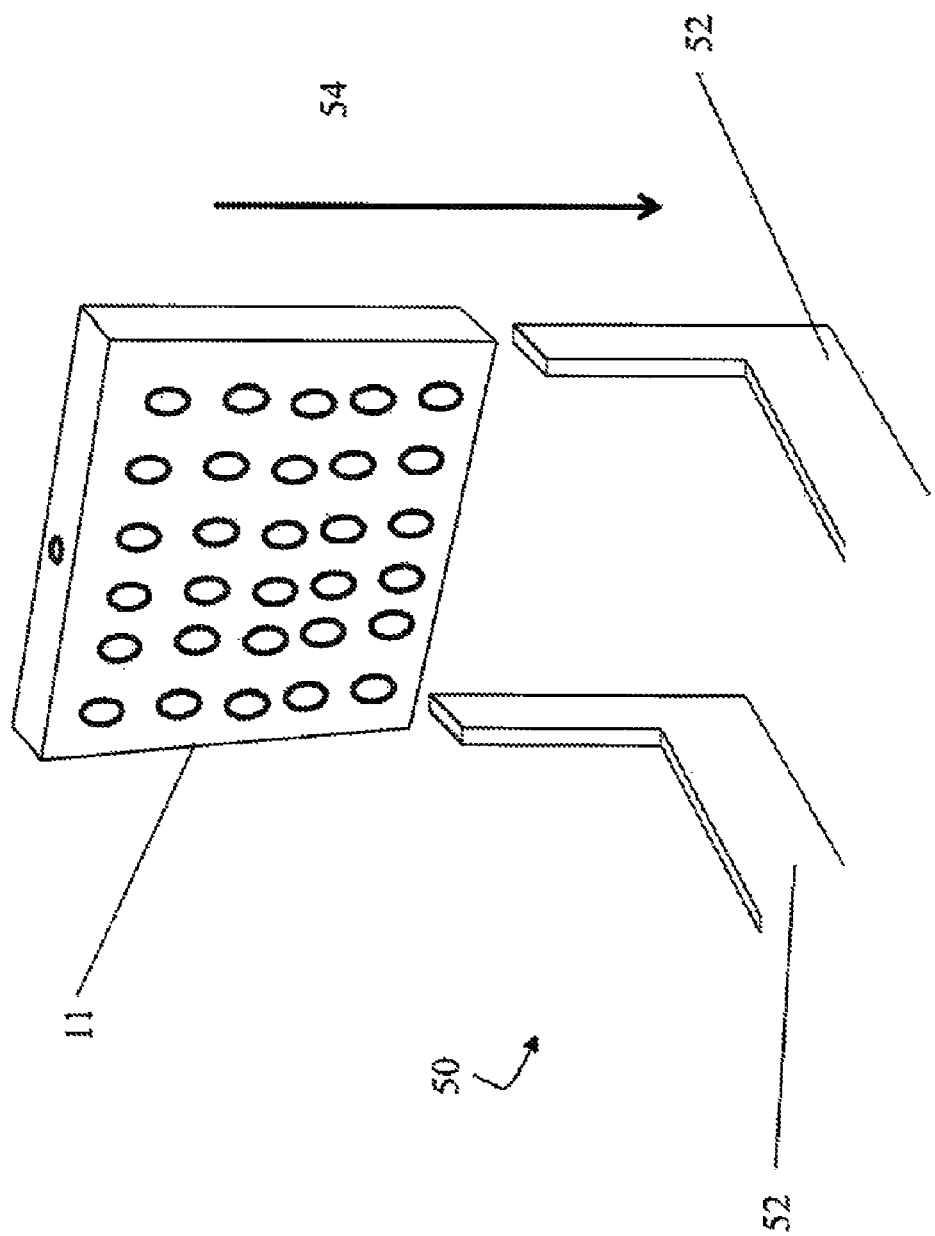
FIG. 4 is an assembly view of the bait station outer shell and a bait station dipping rack.

As shown in FIG. 4, after the wax coating is formulated, the bait station outer shells 11 are prepared for dipping in the coating material. As shown in FIG. 4, the bait station shells 11 are positioned on a dipping rack 50. The dipping rack 50 comprises at least two "L" shaped arms 52 that extend from the base (not shown) of the rack 50. Bait station shells 11 are positioned on the rack 50 by sliding the shells 11 downwardly in the direction of the arrow 54 onto a set of the arms 52. In the preferred embodiment, four sets of arms 52 are aligned in series on a single rack to allow four bait station shells 11 to be simultaneously dipped in the supply reservoir containing the wax coating.

In operation, the bait station shells 11 are dipped in the wax coating supply reservoir for 2-3 seconds and then removed for 5-7 seconds and dipped again. After three immersions, the coated bait station shells 11 are allowed to cool and prepared for immediate use or storage. At the end of the drying process the lure(s) 40 and/or lure holder 30 are inserted inside the shell 11 to comprise an assembled bait station 10. Anecdotal tests indicate that the coated bait stations have a shelf life of at least one year.

In parallel to the fabrication process of the bait station units, field testing was conducted. The aim of these evaluations was to determine the longevity of the bait station as a killing unit. Bait station units were hung from trees in the close vicinity of the laboratory. Every week, baits stations were collected, assessed inside the laboratory and taken back to the field, this process was repeated during several weeks in order to determine the effect of aging/weathering to the integrity of the bait station unit as well as on the killing potential.

Every week, during eight consecutive weeks (during the same day of the week), baits stations were taken to the inside of the laboratory where they were hung from the inner part of aluminum cages. Males and females of the Mediterranean fruit fly (i.e. "medfly") were introduced in similar numbers to each of ten fruit fly enclosures. Fly mortality readings were taken at 8 and 24 hours. All the testing was conducted in a room with appropriate temperature and humidity conditions (24-25° C./75.2-77° F. and 60-65% humidity). For all tested enclosures, the mortality rate was at or near 100% up for up to 8 weeks. After 8 weeks, the inventors noted a gradual reduction in the bait stations' efficacy.

For the foregoing reasons, it is clear that the invention provides an innovative method and apparatus for killing targeted insects (such as fruit flies). The invention may be modified in multiple ways and applied in various technological applications. The current invention may be modified and customized as required by a specific operation or application, and the individual components may be modified and defined, as required, to achieve the desired result.

Although some of the materials of construction are specifically described, construction materials may also include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. An insect bait station comprising:
    a substrate foldable into a bait station outermost shell;
    a toxicant-infused coating covering the outermost shell, the coating covered outermost shell being free of any covering, and
    at least one insect lure consisting of a lure holder, an attractant, and a carrier medium, wherein the at least one lure is positioned inside the outermost shell but not directly attached to the outermost shell, the lure holder being attached to a suspension cord, and the suspension cord suspending the bait station above the ground, an end of the suspension cord inserted through a top alignment aperture of the lure holder in a first direction and inserted through a lower retention aperture of the lure holder in a second direction opposite from the first direction;
    whereby the bait station is structured so that insects attracted to the lure land on the outermost shell coating and are killed by the toxicant.

2. The bait station of claim 1 wherein the coating comprises a wax coating.

3. The bait station of claim 1 wherein the coating comprises paraffin, ethylene vinyl acetate, sorbitan monostearate, corn syrup, sugar, and spinosad.

4. The bait station of claim 1 wherein the outermost shell has one open side, the at least one lure being slidably removable from the one open side.

5. The bait station of claim 1 wherein the at least one lure is surrounded by the outermost shell on three sides.

6. The bait station of claim 1 wherein the outermost shell comprises a rectangular box.

7. The bait station of claim 6 wherein at least one side of the box has at least one aperture exposing a non-sealed surface of the at least one lure.

8. The bait station of claim 1 wherein a first lure is attached to a first side of the lure holder and a second lure is attached to a second side of the lure holder.

9. The bait station of claim 1 wherein more than two lures are attached to the lure holder.

* * * * *